(12) United States Patent
Tang et al.

(10) Patent No.: US 11,862,075 B2
(45) Date of Patent: Jan. 2, 2024

(54) DRIVE CIRCUIT, DRIVE CHIP, AND DISPLAY DEVICE

(71) Applicant: CHENGDU LIPPXIN MICROELECTRONICS CO., LTD, Sichuan (CN)

(72) Inventors: Yongsheng Tang, Sichuan (CN); Li Huang, Sichuan (CN); Shixiong Lu, Sichuan (CN)

(73) Assignee: CHENGDU LIPPXIN MICROELECTRONICS CO., LTD, Chengdu (CN)

( * ) Notice: Subject to any disclaimer, the term of this patent is extended or adjusted under 35 U.S.C. 154(b) by 0 days.

(21) Appl. No.: 18/148,393

(22) Filed: Dec. 29, 2022

(65) Prior Publication Data

US 2023/0237959 A1    Jul. 27, 2023

(30) Foreign Application Priority Data

Jan. 27, 2022 (CN) .......................... 202210101413.3

(51) Int. Cl.
*G09G 3/32* (2016.01)
*G09G 3/20* (2006.01)

(52) U.S. Cl.
CPC ............. *G09G 3/32* (2013.01); *G09G 3/2011* (2013.01); *G09G 2310/027* (2013.01); *G09G 2310/08* (2013.01); *G09G 2330/021* (2013.01)

(58) Field of Classification Search
CPC .. G09G 3/32; G09G 3/2011; G09G 2310/027; G09G 2310/08;

(Continued)

(56) References Cited

U.S. PATENT DOCUMENTS 6,097,379 A     8/2000  Ichiraku
10,541,689 B1 * 1/2020  Chang ........................ H03L 7/07
(Continued)

FOREIGN PATENT DOCUMENTS

CN       102201198       9/2011
CN       106452052       2/2017
(Continued)

OTHER PUBLICATIONS

Chinese Patent Office, "First Office Action" with translation for Application No. 202210101413.3, dated Nov. 18, 2022, 15 pages.

(Continued)

*Primary Examiner* — Richard J Hong
(74) *Attorney, Agent, or Firm* — Haynes and Boone, LLP (57) ABSTRACT

The present disclosure relates to a drive circuit, including: a first module, generating display data based on image information; a second module, generating a display signal based on the display data and a plurality of clock signals; a third module, outputting a constant current based on the display signal; and a fourth module, configured to provide a reference current to the third module, wherein the fourth module includes: a reference voltage generation module, a bias module, a current generation module, and a pre-charging module. Any two adjacent clock signals of the plurality of clock signals differ by M complete clock cycles, where 0≤M<1. This circuit can realize relatively high image display accuracy with relatively low system power consumption and chip cost, and meanwhile realize effective low grayscale compensation for image.

20 Claims, 3 Drawing Sheets

(58) Field of Classification Search
CPC .......... G09G 2330/021; G09G 3/2018; G09G 3/3208; G09G 3/3216; G11C 5/147; H05B 45/325; H05B 45/38; H03L 7/087; H03L 7/0898; H03L 7/07

See application file for complete search history.

(56) References Cited

U.S. PATENT DOCUMENTS

| | | | | |
|---|---|---|---|---|
| 2003/0223275 | A1* | 12/2003 | Abe | G11C 5/147 |
| | | | | 365/189.09 |
| 2005/0017778 | A1 | 1/2005 | Nogawa et al. | |
| 2009/0021455 | A1* | 1/2009 | Miller | G09G 3/3216 |
| | | | | 345/77 |
| 2012/0249192 | A1 | 10/2012 | Matsushita | |
| 2013/0038233 | A1* | 2/2013 | Chu | H05B 45/38 |
| | | | | 315/224 |
| 2013/0285722 | A1* | 10/2013 | Chou | H03L 7/0898 |
| | | | | 327/156 |
| 2014/0210532 | A1* | 7/2014 | Jenkins | H03L 7/087 |
| | | | | 327/159 |
| 2016/0358528 | A1* | 12/2016 | Xie | G09G 3/3208 |
| 2020/0014389 | A1* | 1/2020 | Chang | H03L 7/07 |
| 2021/0112641 | A1* | 4/2021 | Li | H05B 45/325 |
| 2022/0059023 | A1* | 2/2022 | Huang | G09G 3/2018 |

FOREIGN PATENT DOCUMENTS

| | | |
|---|---|---|
| CN | 111028768 | 4/2020 |
| CN | 111724728 | 9/2020 |
| CN | 112967670 | 6/2021 |
| CN | 113948030 | 1/2022 |
| JP | 2003078512 | 3/2003 |
| TW | 202046275 | 12/2020 |
| WO | WO 2019/032899 | 2/2019 |

OTHER PUBLICATIONS

Chinese Patent Office, "Search Results" for Application No. 202210101413.3, dated Nov. 18, 2022, 15 pages.

* cited by examiner

DRIVE CIRCUIT, DRIVE CHIP, AND DISPLAY DEVICE

CROSS-REFERENCE TO RELATED APPLICATION

The present disclosure claims the priority to Chinese patent application with the filing number 202210101413.3 filed on Jan. 27, 2022, with the Chinese Patent Office, the contents of which are incorporated herein by reference in entirety.

TECHNICAL FIELD

The present disclosure relates to the field of display, and specifically to a drive circuit, a drive chip, and a display device.

BACKGROUND ART

The display device is usually driven by a row drive chip and a column drive chip to realize display. The column drive chip is usually a constant current drive chip, wherein an output end of the constant current drive chip is connected to a column line of the LED (display device), and outputs a constant current in a valid period of a display signal, i.e., a PWM (Pulse width modulation) signal, so as to drive LED lamp beads connected on the column line to emit light.

The display accuracy can be used to measure the quality of an LED display device, and generally, the higher the display accuracy is, the better the display quality is when an image is displayed. In the prior art, the accuracy of display data generally processed by a column drive chip of LED is limited, for instance, possibly only display data expressed in integers is processed, for example, actual display data is $3.4*T$ ("$*$" is a symbol of multiplication in the present disclosure), but the column drive chip only drives with the display data of $3*T$, which inevitably results in greatly reduced display effect. Especially in the case of low grayscale, the lost $0.4*T$ will seriously affect the display effect. However, at present, on one hand, in order to improve the display accuracy, a higher display accuracy is usually obtained at the expense of increasing the power consumption, the chip cost, etc.; and on the other hand, in the prior art, the low grayscale compensation effect of an image is not obvious, and the compensation manner is complex.

How to solve the above problems becomes a problem to be solved urgently.

SUMMARY

An objective of the present disclosure is to provide a drive circuit to overcome the shortcomings in the prior art, wherein the drive circuit can improve the display accuracy without increasing the system power consumption and cost, and meanwhile can realize effective low grayscale compensation.

In one aspect, the present disclosure provides a drive circuit, including:

a first module, generating display data based on image information;

a second module, generating a display signal based on the display data and a plurality of clock signals;

a third module, outputting a constant current based on the display signal; and a fourth module, configured to provide a reference current to the third module;

in the above, the fourth module includes: a reference voltage generation module, a bias module, a current generation module, and a pre-charging module, wherein the reference voltage generation module is configured to provide a reference voltage to the bias module, the bias module is configured to provide a bias current to the current generation module and provide a bias voltage to the pre-charging module, and the current generation module is configured to provide a reference current to the third module; and any two adjacent clock signals of the plurality of clock signals differ by M complete clock cycles (clock periods), $0 \leq M < 1$.

The difference is M complete clock cycles, a previous clock signal and a next clock signal have a fixed phase difference therebetween, i.e., $M*T$, T being the clock cycle; it can be understood that the next clock signal is delayed by M clock cycles compared with the previous clock signal; a second clock signal is delayed by M clock cycles compared with a first clock signal; and a third clock signal is delayed by $2*M$ clock cycles compared with the first clock signal, and so on. The purpose of providing this series of clock signals is that by selecting this series of clock signals, the LED drive chip can process higher-accuracy display data, that is, high-accuracy display signal can be generated, i.e., PWM signal, so as to improve the display effect, and perform low grayscale compensation.

Further, a fifth module is further included, configured to generate N clock signals, where $M=1/N$, and N is an integer greater than or equal to 2.

Further, the second module includes:

a first sub-module, generating a first display signal based on a first clock signal and the display data; and a second sub-module, outputting the display signal based on a selected clock signal and the first display signal;

the first clock signal is any one of the N clock signals; and the selected clock signal is delayed by $i/N$ complete clock cycles from the first clock signal, where i is an integer between 0 and $(N-1)$. By selecting the selected clock signal, the magnitude of the fractional part of the display signal can be determined.

In the above, the first sub-module can generate a display signal corresponding to the integral part of the display data, and the second sub-module can generate a display signal containing a fractional part based on the above display signal of the integral part and the selected clock signal.

Further, the second module outputs one of the N clock signals as the selected clock signal according to a selection signal, wherein the selection signal is generated based on the display data. The selection signal can determine the magnitude of the fractional part of the PWM signal, and is actually related to the display data, specifically related to the fractional part of the display data.

For each output channel, the display data of each channel is usually different, therefore, the fractional parts of the PWM signals of various channels are also theoretically different, thus, for each channel, a corresponding selection signal needs to be generated according to the display data of this channel.

Further, the drive circuit further includes a path matching module, configured to eliminate an unknown phase difference between the selected clock signal and the first clock signal. The unknown phase difference also may be understood as unknown delay. In this solution, each channel is configured with a path matching module, it can be ensured that the two clock signals corresponding to each channel only have a desired phase difference, and this phase difference determines the fractional part of the display signal, therefore, it can be determined that the display signal finally generated is more accurate, and will not be affected by unknown delay caused a hardware circuit.

In some embodiments of the present disclosure, the second module includes:

a third sub-module, generating a first display signal based on the first clock signal and a reset signal;

a plurality of fourth sub-modules, wherein each of the fourth sub-modules generates a second display signal based on one clock signal of the second clock signals and the reset signal; and one clock signal of the second clock signals received by each fourth sub-module is different from the other; and a fifth sub-module, receiving the display signals generated by the third sub-module and the plurality of fourth sub-modules, and outputting one of the display signals according to the selection signal.

The first clock signal is any one of the N clock signals; the second clock signal is a clock signal among the N clock signals other than the first clock signal; and the reset signal and the selection signal are generated according to the display data.

The above structure will generate N display signals according to the N clock signals, and select one from the N display signals to output according to the display data.

Further, the second module further includes a sixth sub-module; and the sixth sub-module inverts the signal output by the fifth sub-module and performs a logical operation on the inverted signal and the first display signal.

Further, the first module is further configured to add one clock cycle to the display data and then output the display data. The display data processed by the second module is actually the data generated after 1*T is added to the initial display data, with the purpose that a very rare situation that the display data is decimal fraction, such as 0.3*T, can be processed; on the other hand, after the operation of adding 1*T is performed, no matter for the situation that the display data is decimal fraction or the situation that the integral part of the display data is not 0, a suitable display signal corresponding to the real display data can be obtained for some structures and the second module using a certain logic.

Further, the drive circuit further includes: a compensation module, configured to eliminate an unknown delay between the first display signal and the display signal selected by the selection signal. By the same reasoning, this solution can ensure that two display signals corresponding to each channel have only desired delay therebetween. Generally, the rising edges or the falling edges of the above two signals are aligned, however, the two signals pass through different circuits, then different delays will be introduced between the two, so that the rising edges or the falling edges cannot be aligned, thus, a signal obtained after the logical processing may not be a theoretical signal, mainly reflected in that the signal width is no longer a theoretical width. By means of compensation, it can be ensured that the delays introduced between the two display signals are the same, so as to ensure that edges (rising edges or falling edges) of the two are still aligned, and thus it can be ensured that a display signal width after the logical processing is a theoretical value or a desired value. The display signal width determines the fractional part of the display signal, and therefore the display signal finally generated is more accurate.

Further, the drive circuit further includes a current trimming module; and the current trimming module is connected to the current generation module and provides a trimming current to the current generation module.

Further, the drive circuit further includes a voltage trimming module, the voltage trimming voltage is connected to the pre-charging module and provides a trimming voltage to the pre-charging module. The current trimming module and the voltage trimming module can provide higher-accuracy voltage and current to the drive circuit.

In another aspect, the present disclosure further provides a drive chip, including the drive circuit.

In another aspect, the present disclosure further provides a display device, including display equipment and the drive chip, wherein the drive chip generates a drive signal so as to drive the display equipment to display.

The present disclosure has the following beneficial effects:

the present disclosure can obtain a relatively accurate display signal, improve the display accuracy, reduce the chip cost and power consumption, and can realize effective low grayscale compensation;

by using the path matching modules and the compensation modules, a relatively accurate display signal can be further obtained, and the influence of delay caused by the fact that different signals pass through different paths is eliminated;

the voltage trimming and the current trimming are included, then precise voltage and current can be obtained; and the pre-charging voltage is provided, the column line is charged to a corresponding potential during the non-display period, then coupling, a lower ghost image, cross-board color difference (i.e., the color differences between the LED display unit boards), etc. can be eliminated.

DETAILED DESCRIPTION OF EMBODIMENTS

The technical solutions of the present disclosure are further described below with reference to specific embodiments, and it should be noted that the scope of protection of the present disclosure is not limited to the following description.

Figure 1:
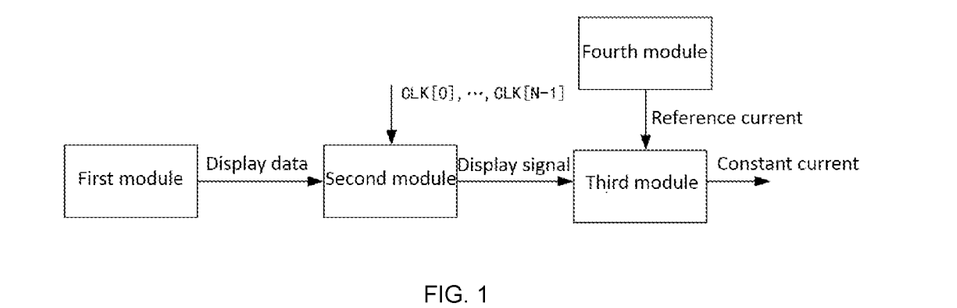
FIG. 1 is a schematic view of a drive circuit provided in an embodiment of the present disclosure.

The present disclosure provides a drive circuit, which, as shown in FIG. 1, includes:

a first module, generating display data based on image information;

a second module, generating a display signal based on the display data and a plurality of clock signals; and a third module, outputting a constant current based on the display signal.

In the above, any two adjacent clock signals of the plurality of clock signals differ by M complete clock cycles, $0 \leq M < 1$.

Image data information transmitted from outside can be stored in an SRAM (Static Random-Access Memory); and relevant processing can be performed on the image information by the first module to generate the display data and store the same. The processing may include adding one clock cycle to the actual display data, that is, the first module is further configured to add one clock cycle to the display data and then output the same as final display data; definitely, this operation is not necessary, and depending on the selection, whether to execute this operation needs to be selected according to a PWM generation circuit or a specific PWM generation method. An initial display signal with a corresponding width, also referred to as an initial PWM signal, is generated according to the size of display data, which can be realized by means of counting. Optionally, a counting module can be constituted by a flip-flop, and the counting module counts the display data based on a GCLK clock signal, and generates the initial display signal with a width of integer clock cycles (integer number of clock cycles). The second module performs subsequent processing based on the initial display signal. It can be understood that generating the initial display signal by means of counting also may be performed outside the second module, and in this case, the second module receives the above initial display signal and performs subsequent processing. That is to say, the counting module can be included in the second module, in the first module, even independent of the first module and the second module and located between the two, which receives the display data of the first module, converts the same into the initial display signal and then inputs the same into the second module.

A previous clock signal and a next clock signal have a fixed phase difference therebetween, i.e., $M*T$, T being the clock cycle; it can be understood that the next clock signal is delayed by M clock cycles compared with the previous clock signal; a second clock signal is delayed by M clock cycles compared with a first clock signal; and a third clock signal is delayed by $2*M$ clock cycles compared with the first clock signal, and so on. The second module is in fact a pulse width signal generating device (PWM generating device), which may consist of a flip-flop and/or a logical circuit. It can be understood that the magnitude of M determines the accuracy of the display signal or the PWM signal. M is the minimum scale (relative to the clock cycle T) at which the display signal can be represented, that is, the display signal can be accurate to $M*T$. It can be understood that the width of the above initial display signal is integer clock cycles. That is to say, it represents the integral part of actual display data, which is also the mainstream technology in the prior art, i.e., the drive chip processes the display data of integer clock cycles, and performs control according to the display signal of integer clock cycles. The disadvantage thereof lies in that the display accuracy is impaired. For example, the actual display data is $3.2*T$, but only $3*T$ is actually displayed. However, in the present disclosure, not only an integral part of the display data is acquired, but also a fractional part of the actual display data is acquired by a delayed clock signal. For example, if the display data is $3.2*T$, $3*T$ (initial display signal) can be obtained by counting, and the fractional part $0.2*T$ is also obtained by using a delayed clock signal (M=0.2), so that the display signal finally obtained is the actual $3.2*T$. In the above, T is the clock cycle. It can be seen that when M=0.2, the accuracy of the display signal which can be generated in the present disclosure is $0.2*T$. In this manner, relatively high display accuracy can be obtained at the minimum expense without increasing the sampling frequency or increasing the chip cost and power consumption.

The third module is connected to the second module and outputs a constant current. The third module can output a constant current during the valid period of the display signal, for example, a high level period of the PWM signal. Specifically, the third module receives a reference current, and the third module receives the display signal output by the second module, and can output a constant current to a column line during the valid period of the display signal, for example, the high level period of the PWM signal, and drive LED lamp beads on the column line where the third module is located to light up. The number of third modules is equal to the number of channels, and the number of channels is generally an integer greater than or equal to 4, preferably 8 channels and 16 channels. In other words, the third module actually is a module that can output a constant current according to the PWM signal.

Figure 10:
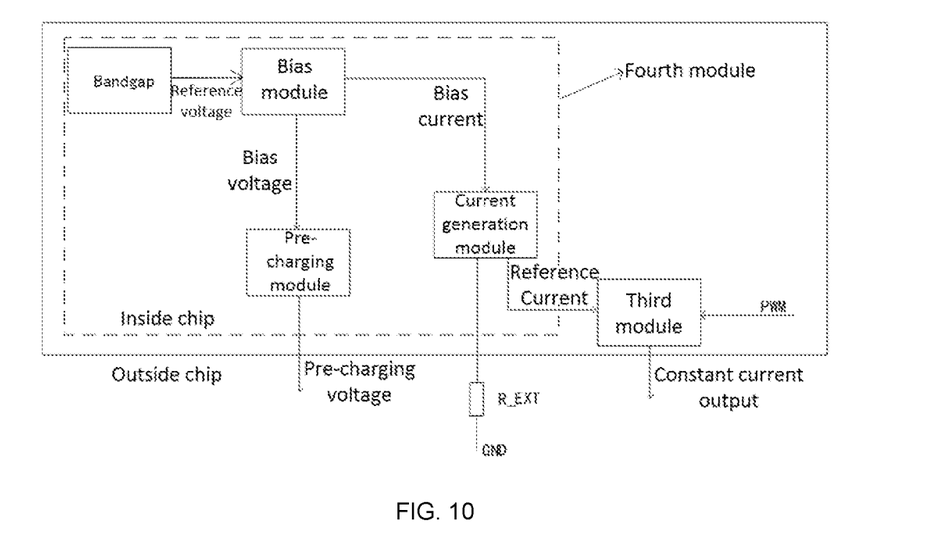
FIG. 10 is a schematic view of a fourth module provided in an embodiment of the present disclosure.

There are various methods for generating the reference current, and the method for generating the reference current is described below with reference to FIG. 10. In the present disclosure, a fourth module is used to provide a reference current for the third module. Specifically, the fourth module includes: a reference voltage generation module, a bias module, a current generation module, and a pre-charging module, wherein the reference voltage generation module is configured to provide a reference voltage to the bias module, the bias module is configured to provide a bias current to the current generation module and provide a bias voltage to the pre-charging module, and the current generation module is configured to provide a reference current to the third module.

Bandgap can be selected as the reference voltage generation module. Bandgap (Bandgap voltage reference), i.e., a bandgap reference, can realize a voltage reference independent of temperature by using a sum of a voltage having a positive temperature coefficient and a voltage having a negative temperature coefficient, where the temperature coefficients of the two cancel each other. The pre-charging module outputs a pre-charging voltage during a non-display period, wherein the pre-charging voltage is configured to charge the column line and charge the same to a pre-determined potential, so as to solve poor display problems such as relatively dark first line, coupling of high grayscale and low grayscale, cross-board color difference, and a lower ghost image existing in display. In the above, the pre-charging module is an existing technology, and will not be described in detail in the present disclosure. Definitely, it is also possible that the fourth module is not be provided with a pre-charging module. Certainly, in the prior art, due to the influence of factors such as parasitic capacitance, for the LED display, poor display problems such as darker first line, high and low grayscale coupling, cross-board color difference, and a lower ghost image often occur, therefore, substantially all the LED display drive circuits are provided with a pre-charging module. In order to improve the voltage accuracy of this module, a voltage trimming module is usually further provided, i.e., a voltage trimming circuit is provided between the bias module and the pre-charging module, which receives a bias voltage provided by the bias module, and performs voltage trimming by using a register, to obtain a more accurate trimming voltage and input the same into the pre-charging module.

Optionally, a current trimming module may be provided between the bias module and the current generation module, and the current trimming module performs current trimming by using a register. Specifically, the current trimming module is located between the bias module and the current generation module, receives a bias current, and provides a high-accuracy trimming current for the current generation module; and the current generation module receives the trimming current and provides a reference current to a current output module. A current with higher accuracy can be obtained through the trimming module. The current trimming module can be obtained by combining current mirrors.

The current generation module can generate an accurate reference current to the channel current output module. Optionally, the current generation module further can be connected to an external resistor, wherein the external resistor refers to a resistor outside a chip, and this resistor is adjustable and can be used to adjust a current of a branch where the resistor is located.

Figure 2:
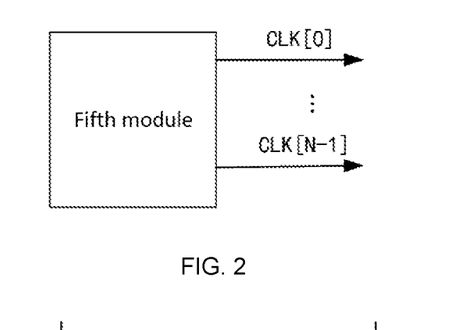
FIG. 2 is a schematic view of a fifth module provided in an embodiment of the present disclosure.
Figure 9:
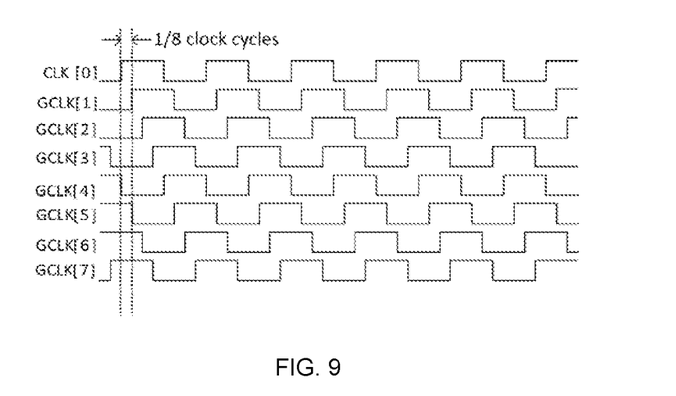
FIG. 9 is a schematic view of a multi-phase clock signal provided in an embodiment of the present disclosure.

In some embodiments, as shown in FIG. 2, the plurality of clock signals are N clock signals; and the N clock signals may be generated by a fifth module, such as CLK[0]~CLK[N−1]. N is an integer greater than or equal to 2, and preferably, N is an integer greater than or equal to 4. In this case, M=1/N. That is, adjacent clock signals are different by 1/N clock cycles or the phase difference is 1/N clock cycles; it can be understood that the next clock signal is delayed by 1/N clock cycles from the previous clock signal (for ease of understanding, referring to FIG. 9, as can be seen from a certain time point on a time axis, for example, from a time point where a certain rising edge of a first clock signal is located, after this time point, first rising edges of subsequent clock signals are delayed by 1/N, 2/N, . . . , (N−1)/N) in sequence from the rising edge of the first clock signal. Optionally, frequencies of the N clock signals are the same as the frequency of the above GCLK. The fifth module may be one of a delay phase-locked loop DLL, a phase interpolator, and a phase-locked loop PLL.

Figure 3:
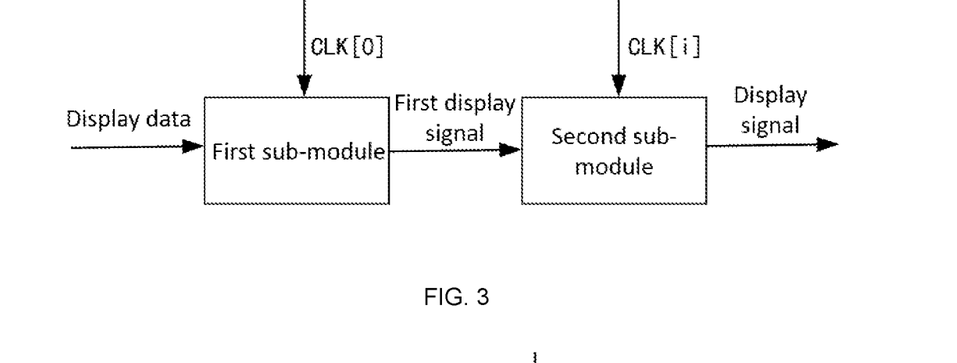
FIG. 3 is a schematic view of a second module provided in an embodiment of the present disclosure.

In some embodiments, as shown in FIG. 3, the second module includes:

a first sub-module, generating a first display signal based on a first clock signal and the display data; and a second sub-module, generating the display signal based on the selected clock signal and the first display signal.

The first clock signal is any one of the N clock signals; and the selected clock signal is delayed by i/N complete clock cycles from the first clock signal, where i is an integer between 0 and (N−1).

It is assumed that the N clock signals are CLK[0]-CLK[N−1]. The first clock signal is any one of the N signals, for example, CLK[0] or CLK[3] may be selected as the first clock signal. If CLK[0] is selected as the first clock signal, CLK[1] is delayed by 1/N clock cycles from CLK[0], CLK[2] is delayed by 1/N clock cycles from CLK[1], CLK[2] is delayed by 2/N clock cycles from CLK[0], . . . . If CLK[3] is selected as the first clock signal, CLK[4] is delayed by 1/N clock cycles from CLK[3], CLK[0] is delayed by 1/N clock cycles from CLK[N−1], CLK[1] is delayed by 1/N clock cycles from CLK[0], and CLK[2] is delayed by 1/N clock cycles from CLK[1]. It can be understood that in this case, the accuracy of the display data can reach T/N (the accuracy is 1/N with T as unit). The present disclosure generates the fractional part of display data or data related to the fractional part based on the phase difference or delay of a selected clock signal CLK[i] relative to the first clock signal, where i is an integer between 0 and (N−1). Taking CLK[0] being selected as the first clock signal as an example, the fractional part is i*T/N, (N−i)*T/N or others, and a specific numerical value of the fractional part is also related to the selection of the logical module or the subsequent processing.

In some embodiments, the above first sub-module is configured to generate a display signal with a width of integer clock cycles; and it represents the integral part of the display data. The first sub-module may receive the above initial display signal and generate a first display signal based on the initial display signal and the first clock signal. It can be understood that the initial display signal actually represents the integral part of the display data. In this case, the display data received by the first sub-module in FIG. 3 is the initial display signal; and the first sub-module may be optionally a flip-flop, for example, a D flip-flop or an RS flip-flop. When it is a D flip-flop, optionally, the initial display signal is connected to a D terminal, the first clock signal is connected to a CLK terminal, and a Q terminal is used as output. It can be understood that the first display signal also represents the width corresponding to the integral part of the display data, which is the width of integer clock cycles, with a rising edge thereof being aligned with an edge (rising edge or falling edge) of the first clock signal, and the width being the same as that of the initial display signal. In some embodiments, the first sub-module also may include a process of generating an initial display signal of a width of integer clock cycles from the display data. As described above, this function can be realized by means of counting, and the counting module can be constituted by flip-flop. The counting module counts the display data based on the GCLK clock signal, and generates the initial display signal with a width of integer clock cycles. A D flip-flop or an RS flip-flop may be selected as the flip-flop constituting the counting module. The first sub-module obtains the first display signal based on this initial display signal and the first clock signal, as described above.

The above second sub-module receives the selected clock signal and the first display signal, and performs corresponding processing and operation on the first display signal so as to output the final display data, wherein the display data may be a display signal containing a fractional part.

In some embodiments, the above second sub-module includes an intermediate module, wherein the intermediate module receives the selected clock signal and the first display signal, and generates an intermediate display signal. The intermediate display signal has the same width as the first display signal, and has a delay relative to the first display signal (the delay can be determined by a delay of the selected clock signal that is selected relative to the first clock signal), such as i*T/N, where i is an integer between 0 and (N−1). The intermediate module may be a flip-flop, for example, a D flip-flop or an RS flip-flop. When the intermediate module is a D flip-flop, optionally, the first display signal is connected to a D terminal, the selected clock signal is connected to a CLK terminal, and a Q terminal is used as output.

In the present disclosure, the second sub-module further includes a logical module, which can perform a logical operation, such as logical OR, on the intermediate display signal and the first display signal, so as to obtain the final display data. In this case, optionally, as described above, it is also possible to add one clock cycle to the display data, so as to facilitate processing the situation that the display data is decimal fraction, in this case, the width of one clock cycle must be deducted from the display signal after OR (de-widening), for example, a flip-flop may be provided to generate a display signal with a length of one clock cycle aligned with a rising edge of the first display signal or the display signal after the logical OR, invert this display signal, and perform an AND operation on the inverted display signal and the display signal after OR, or perform an XOR operation on this display signal and the display signal after the logical OR. Definitely, other logical circuits also may be used for implementation. It can be understood that the situation that the display data is decimal fraction hardly exists, or the display data may be processed so that the situation that the display data is decimal fraction does not exist, therefore, an OR operation may be directly performed on the first display signal and the intermediate display signal, to directly obtain the final display signal, without considering the problem of adding one clock cycle.

Optionally, a logical AND operation also may be performed on the intermediate display signal and the first display signal, in this case, in order to obtain the final display signal, optionally, the width of one clock cycle may be added to the signal obtained after the AND operation (that is to say, the signal obtained after the AND operation is widened by one clock cycle). A PWM signal with the width of one clock cycle may be generated by the flip-flop or other devices, for example, at a moment of a falling edge of the signal obtained after the AND operation or a falling edge of the first display signal, and then an OR operation is performed on this PWM signal and the signal obtained after the AND operation; taking CLK[0] being selected as the first clock signal as an example, if the display data is 3.3*T, and then CLK[i] is taken as the selected clock signal, the intermediate display signal is delayed by i*T/N relative to the first display signal. The initial display signal is 3*T, and the signal obtained after the AND operation is actually 3T−i*T/N. Therefore, i/N may be selected as 7/10, that is, CLK[7] is selected, and N=10, then the signal obtained after the AND operation is actually 2.3*T. Finally, the final display data is obtained by adding the width of one clock cycle on the basis of 2.3*T. Definitely, it is also possible that the width of one clock cycle is not added at the end, but the width of one clock cycle is added when the initial display signal or the first display signal is generated. This method is the same as the method of adding the width of one clock cycle to the signal after AND, that is, a signal with the width of one clock cycle is generated by using the falling edge of the first display signal (or the initial display signal), and is subjected to an OR operation with the first display signal (or the initial display signal). Definitely, optionally, there is also another method for obtaining the final display signal, that is, directly adding one clock cycle to the display data input into the second module and then performing subsequent processing, for example, the initial display data is 3.2*T, and becomes 4.2*T after one clock cycle is added. Assuming that N=10, CLK[0] and CLK[8] are respectively selected as the first clock and the selected clock, the width of the display signal after the AND operation is just 3.2*T. It should be noted herein that CLK[8] is selected instead of CLK[2]. Therefore, if the logical module is AND, attention should be paid to the selection of the clock signal. Definitely, the operation of adding T also can be performed in the second module. Adding one clock cycle can have two advantages, one is that it is applicable to the situation that the display data is decimal, i.e., the integral part is 0, such as 0.3*T (definitely, this case hardly occurs); and the other advantage is that the final display signal can be obtained directly.

In some other embodiments, in addition to the above modules, the second sub-module further includes an inverting module, the output terminal of the intermediate module is connected to the input terminal of the inverting module, the inverting module inverts the above intermediate display signal, and the inverted signal and the first display signal are input into the logical module to undergo a logical operation. The logical operation may include logical AND, logical OR, XOR, XNOR, or other logical gates and combinations thereof. When the logical AND or XNOR is selected, an output signal is decimal, for example, 0.2 T; therefore, this technical solution of the present disclosure can directly generate decimal data, which is advantageous to circumstances where decimal display data is needed; definitely, if it is necessary to obtain complete display data according to the situation, it is still necessary to add a certain width to the signal after the AND, and this width can be selected as the width of the integral part represented by the first display signal. For example, a display signal with the width of an integral part may be generated by the flip-flop at the falling edge of the signal after AND, and an OR operation is performed on this display signal and the above display signal of the decimal part. Noting that it is unnecessary to add one clock cycle to the initial display data herein, because the case where the display data to be displayed is decimal actually hardly occurs. Definitely, it is also possible to select to add 1*T, in this case, the display signal with the width of an integral part is no longer generated by the flip-flop, but a display signal with the width of the integral part minus 1*T is generated. It can be understood that the display data generally includes an integral part, where the integral part is not 0.

Definitely, the logical modules in the second sub-module are not limited to the several logical modules in the above, and other logical modules also may be used, such as AND, OR, XOR, XNOR, NOT gate, etc. or a combination thereof, as long as they generate the required display signal according to the intermediate display signal and/or the first display signal, which is not limited in the present disclosure.

Figure 4:
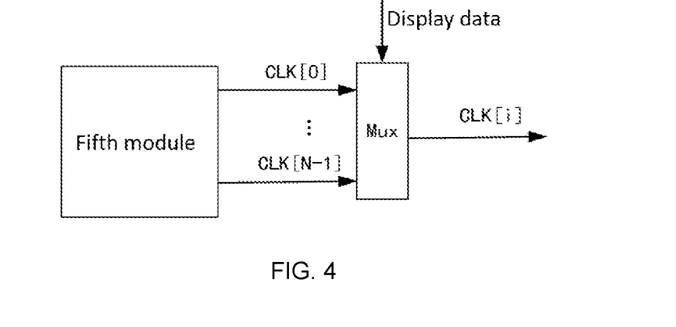
FIG. 4 is a schematic view of generation of a selected clock signal provided in an embodiment of the present disclosure.

In some embodiments, as shown in FIG. 4, the second module (including Mux) outputs one of the N clock signals as the selected clock signal according to the selection signal, wherein the selection signal is generated based on the display data. In fact, the selection signal is used to generate the fractional part of the display data, therefore, the selection signal needs to be generated according to the fractional part of the actual display data, so as to determine which one of the N clock signals is selected. For specific selection, reference can be made to the description in the foregoing part, and the fractional part that is actually generated is not only related to the selected clock signal and the first clock signal, but also related to the finally selected logical module. Therefore, in actual processing, there also may be a processing of widening or de-widening the initial display signal, the first display signal or the signal, a problem of selecting the selection signal, a processing of adding one clock cycle to the initial display data, etc. Definitely, these processings do not necessarily exist based on different applications.

Figure 5:
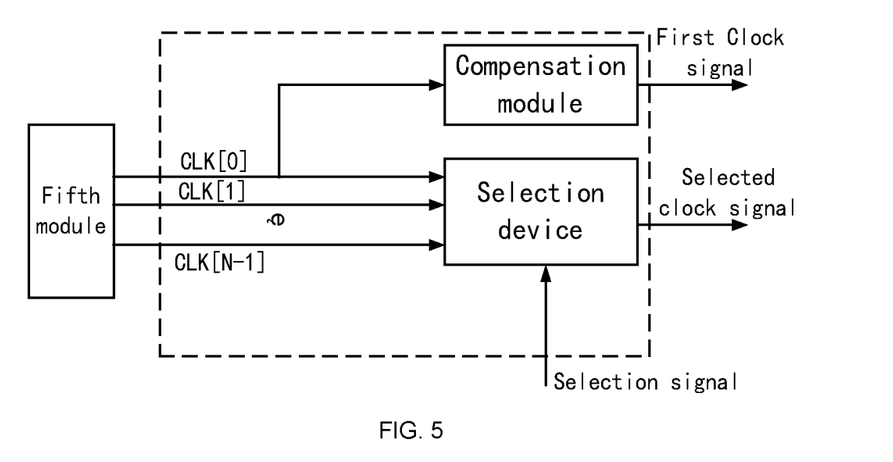
FIG. 5 is a schematic view of a path matching module provided in an embodiment of the present disclosure.

In some embodiments, as shown in FIG. 5, the drive circuit further includes: a path matching module, wherein the path matching module is configured to eliminate an unknown phase difference between the selected clock signal and the first clock signal. By using the preceding method, as for a plurality of clock signals, after being selected by the Mux, one of the clock signals is input into the second sub-module as selected clock signal, and meanwhile, the first clock signal, such as CLK[0], is directly input into the first sub-module. In the present disclosure, the drive circuit is able to obtain a high-accuracy display signal, which mainly relies on a phase difference between the first clock signal and the selected clock signal, so as to obtain a fractional part, for example, i*T/N and (N-i)*T/N. However, taking the case where CLK[0] is the first clock signal and CLK[i] is the selected clock signal as an example, as the first clock signal CLK[0] and the selected clock signal CLK[i] generated by the fifth module respectively experience different circuits (logical paths or circuit paths) before respectively reaching the first sub-module and the second sub-module, mainly that CLK[0] is directly input into the first sub-module, and CLK[i] is input into the second sub-module after passing through Mux, wherein logical circuits or a combination thereof exist in the Mux, and other electronic components also may exist therein, the two clock signals may have different delays in transmission paths or logical paths. As a result, accurate display data cannot be obtained finally after the logical operation. The path matching module is provided, wherein the path matching module includes two parts, i.e., a selection device and a compensation module. The selection device, with the function equivalent to Mux, is used to replace the preceding Mux, which outputs one from a plurality of clock signals as the selected clock signal based on the selection signal (or the display signal); and the compensation module receives and outputs the first clock signal, and its practical effect is performing certain delay compensation on the first clock signal, i.e., applying a certain delay to the first clock signal, so as to match the delay of the selected clock signal applied by a circuit or a logical path in the selection device through which the selected clock signal passes (the delay can be understood as an unknown phase difference). When the delays of the two parts are equal, the first clock signal and the selected clock signal will maintain a desired phase difference or delay, which can ensure the accuracy of the display signal. In the above, the selection signal is generated based on the display data.

Optionally, the logical path of the first clock signal passing through the compensation module is completely the same as the logical path of the selected clock signal passing through the selection device. It can be understood that taking that CLK[0] is the first clock signal and CLK[i] is the selected clock signal as an example, the same logical path means that a circuit path or electronic component(s) that the CLK[0] passes through the compensation module is the same as a circuit path or electronic component(s) that the CLK[i] passes through the selection device, including component type, connection sequence, etc. Thus, in fact, the compensation module is a copy of the circuit path of CLK[i] passing through the selection device. It should be noted that the selection device is fixed and unchangeable, therefore, the compensation module is provided to match a logical path through which a certain clock signal in the selection device passes, i.e., a circuit path or electronic component(s) through which CLK[i] passes through the selection device. The compensation module can be designed according to the selection device to realize the matching.

Figure 6:
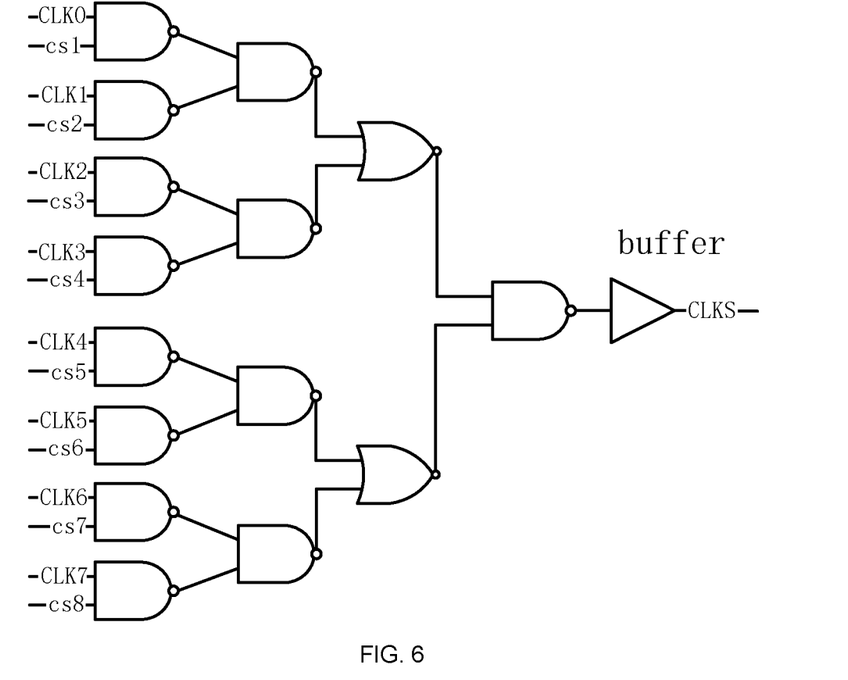
FIG. 6 is a circuit diagram of a selection device of the path matching module provided in an embodiment of the present disclosure.
Figure 7:
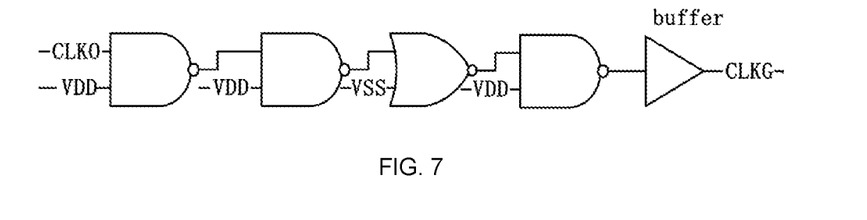
FIG. 7 is a schematic view of a compensation module of the path matching module provided in an embodiment of the present disclosure.

The path matching module provided in an embodiment is as shown in FIG. 6 to FIG. 7. Taking a 8-phase clock signal as an example, it can be seen from the drawings that, in a logical path through which the first clock signal passes, an NAND gate, an NAND gate, an NOR gate, an NAND gate, and buffer are successively provided; a path through which any selected clock signal passes is also an NAND gate, an NAND gate, an NOR gate, an NAND gate, and a buffer. The above buffer is optionally as an inverter, and it is not necessary. The cs may be generated by a decoder, for example, a 3-8 decoder. As described above, in fact, the cs is related to the display data, and it also may be understood that a control word is generated according to the display data, and is used as an input of the decoder. Definitely, the 8-phase clock signal is taken as an example in the above, but when the number of multi-phase clock signals is other numbers, circuit diagrams inside the compensation module and the selection device also need to be adaptively modified, which are all for the purpose of making the logical path of the clock signal passing through the compensation module completely the same as the logical path of the clock signal passing through the selection device, that is to say, the compensation module copies a logical path of a certain clock signal passing through the selection device.

In addition, it should be noted that the present disclosure further can include a second module of the following structure, which is different from the preceding second module in that it does not have the above second sub-module, but includes N intermediate modules, and each intermediate module receives one of the N clock signals and the first display signal. Definitely, the clock signals received by various intermediate modules are different from each other. On this basis, each intermediate module (using the same circuit structure as that of the preceding intermediate module, such as a flip-flop) generates the intermediate display signal based on the received clock signal and the first display signal. The second module further includes a selection module, wherein the selection module receives outputs of various intermediate modules and outputs one as a last intermediate display signal based on the display data. The logical processing on the last intermediate display signal and the first display signal is the same as the method and related processing (such as widening, de-widening, or adding one clock cycle to the preceding display data) of the logical operation on the intermediate display signal and the first display signal introduced in the preceding. The second module of the present structure does not select the clocks, but selects the generated display data.

Figure 8:
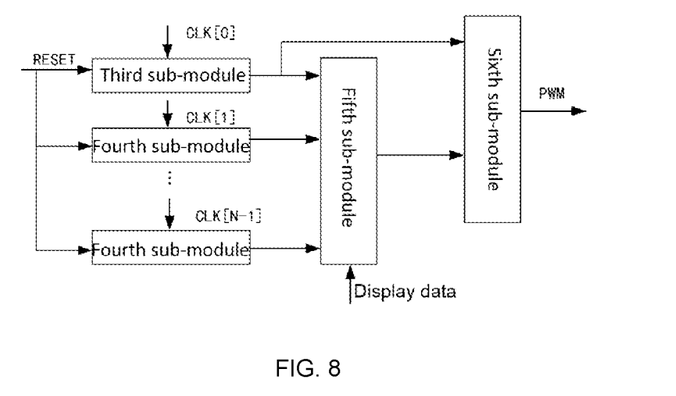
FIG. 8 is a schematic view of a second module provided in another embodiment of the present disclosure.

The present disclosure further provides a second module of another structure, and this second module is different from the first type of second module in the preceding. As shown in FIG. 8, compared with the first type of second module in the preceding, the second module of this structure does not select the plurality of clock signals, but selects the display signals generated by various display signal generation modules, as the selection signal is related to the display data, an output of a corresponding display signal generation module is selected to be output based on the display data. Meanwhile, it should be noted that the second module of such a structure as mentioned below includes a third sub-module, a fourth sub-module, a fifth sub-module, etc., and they are merely names, without necessarily indicating that the first sub-module and the second sub-module in the second module of the preceding structure are included in the second module of the following structure.

The second module includes:
a third sub-module, generating a first display signal based on the first clock signal and a reset signal;
a plurality of fourth sub-modules, wherein each of the fourth sub-modules generates a second display signal based on one clock signal of the second clock signals and the reset signal; and one clock signal of the second clock signals received by each fourth sub-module is different from the other; and a fifth sub-module, receiving the display signals generated by the third sub-module and the plurality of fourth sub-modules, and outputting one of the display signals according to the selection signal.

The first clock signal is any one of the N clock signals; and the second clock signals are clock signals among the N clock signals other than the first clock signal; and the reset signal and the selection signal are generated according to the display data. Optionally, the reset signal is the first display signal in the preceding embodiments, that is, the display signal generated according to the first clock signal and the display data in the preceding embodiments, therefore, the same structure or circuit as that of the first sub-module in the preceding embodiments may be used to generate the reset signal, and the reset signal actually also represents an integral part of the display data. The third sub-module and the plurality of fourth sub-modules in the present embodiment are collectively referred to as a display signal generation module hereinafter. Each display signal generation module may be selected as a flip-flop, such as a D flip-flop (DFF) or an RS flip-flop or other flip-flops. The flip-flop has a reset terminal RESET. The reset terminal receives the reset signal. The display signal (the first display signal, one of the plurality of second display signals) output from the fifth sub-module can be directly output as the display signal; the display data also may be processed by adding one T, in this way, the situation that the display data is decimal can be processed, and the obtained signal is directly corresponding to the width corresponding to the initial display data. Definitely, it is also possible that the case of decimal is not considered, and the processing of adding one T is not performed, but a width is added after the fifth sub-module outputs the signal (that is to say, the signal output by the fifth sub-module is widened by one clock cycle). The adding method (i.e., the widening method) has been introduced in the above, and will not be repeated herein. No matter which method is used, in order to obtain a suitable display signal, the selection of the second clock signal, for example, the selection of the selected clock signal as introduced above, needs to be noted, for example, in order to obtain 3.2*T, the second clock signal that actually needs to be selected may be CLK[8] instead of CLK[2].

Optionally, when a flip-flop having a reset terminal is selected, for example, a D flip-flop having a reset terminal, in this case, the third sub-module has a D terminal connected to VSS, a CK terminal receiving the first clock signal, for example, CLK[0], a Q terminal used as output, and a reset terminal RN receiving a reset signal; and the fourth sub-module has a D terminal connected to VDD, a CK terminal receiving a certain second clock signal, for example, CLK[1], a Q terminal used as output, and a reset terminal RN receiving a reset signal.

Definitely, logical processing also may be performed on a signal output by the fifth sub-module, for example, inversion is performed on the signal output by the fifth sub-module, and then a logical operation is performed on the inverted signal and the first display signal. That is, the second module further includes a sixth sub-module; and the sixth sub-module inverts the signal output by the fifth sub-module and performs a logical operation on the inverted signal and the first display signal. It should be noted that the inversion in the present disclosure may be realized by an inverter or a NOT gate, and optionally, logical AND is performed on the inverted signal and the first display signal. In addition, the sixth sub-module also may be implemented in the following manner, that is, the sixth sub-module is XOR, and performs an XOR operation on the signal output by the fifth sub-module and the first display signal. In any of the above manners, the data after the logical AND or the XOR may be used as the display signal. Definitely, the width of integer clock cycles also may be added directly to the display signal after the logical AND or the XOR (that is to say, the display signal after the logical AND or the XOR may be widened directly by integer number of clock cycles), and the integer clock cycles may be selected as the width of the first display signal. It should be noted that the width of integer clock cycles refers to the width corresponding to the integral part of the display data, such as 4*T. The method of adding the width has been described above, and will not be repeated herein. It should be understood that the difference therebetween only lies in that the value of the width added may be different. In addition, one clock cycle also may be added to the display data. In this case, the width added will be the integral part minus 1*T. Assuming that the actual display data is 3.3*T, the display data after the addition of T is 4.3*T, and the width added is 3*T. Definitely, the logical module that performs the logical processing or the subsequent processing of the logical module and the processing on the display data are not limited thereto, and different logical processing methods or circuits also may be designed according to requirements, such that the width of integer clock cycles is added to a suitable display signal, so as to generate the display signal which can be accurate to a fractional part, thus improving the display accuracy. Optionally, when a flip-flop with a reset signal is used, for example, a DFF with reset, the third sub-module and the fourth sub-module have the D terminals connected to VDD, the CK terminals receiving a corresponding clock signal, the Q terminals used as output, and the reset terminals RN receiving the reset signal.

It can be understood that in the present embodiment, the third sub-module generates the first display signal based on the first clock signal and the reset signal. The reset signal is associated with the display data, and a particular case is that the reset signal can be generated on the basis of the first sub-module of the embodiment of the second module of the preceding structure.

There are a plurality of fourth sub-modules, for example, N−1 fourth sub-modules, and each clock signal in the second clock signals is respectively input into each fourth sub-module, such as a CK terminal. That is, the clock signals received by various CK terminals are different from each other. For example, the first one of the second signal generation module receives CLK[1], the second one of the second signal generation module receives CLK[2], and an (N−1)th second signal generation module receives CLK[N−1].

Optionally, the drive circuit further includes:

a compensation module, configured to eliminate an unknown delay between the first display signal and the display signal selected by the selection signal.

It should be noted that, in the present embodiment, the function of the compensation module is the same as that of the preceding compensation module, and the fifth sub-module is equivalent to the preceding selection device. The logic path of the first display signal passing through the compensation module is identical to the logical path of the display signal selected by the selection signal passing through the selection device (fifth sub-module). This solution can ensure that there is only desired delay between two display signals. Generally, the rising edges or the falling edges of the above two signals are aligned, however, the two signals pass through different circuits, then different delays will be introduced between the two, so that the rising edges or the falling edges cannot be aligned, thus, a signal obtained after the logical processing may not be a theoretical signal, mainly reflected in that the signal width is no longer a theoretical width. By means of compensation, it can be ensured that the delays introduced between the two display signals are the same, so as to ensure that edges (rising edges or falling edges) of the two are still aligned, and thus it can be ensured that a display signal width after the logical processing is a theoretical value or a desired value. The display signal width determines the fractional part of the display signal, and therefore the display signal finally generated is more accurate.

Optionally, the number of second modules is H, where H is the number of channels and is an integer greater than or equal to 4.

That is to say, for a drive circuit having H output channels, each channel includes a second module. Optionally, there is one fifth module, and it provides the plurality of clock signals to all channels. Correspondingly, each channel may be configured with a compensation module and a selection device respectively.

Optionally, the first module of the present disclosure is further configured to add one clock cycle to the display data and output the same. That is, the display data processed by the second module is actually the data generated after 1*T is added to the initial display data, with the purpose that a very rare situation that the display data is decimal, such as 0.3*T, can be processed; on the other hand, after the operation of adding 1*T is performed, no matter for the situation that the display data is decimal or the situation that the integral part of the display data is not 0, a suitable display signal corresponding to the real display data can be obtained for the second module in some structures and using a certain logic, for example, a situation that the second module of the preceding first structure uses the AND gate.

In addition, the present disclosure further provides a drive chip, which includes the preceding drive circuit.

The present disclosure further provides a display device, which includes display equipment and the preceding drive chip, wherein the drive chip generates a drive signal so as to drive the display equipment to display. The display device in the present embodiment may be understood as a device that can independently complete the display of a signal or an image, such as an advertising screen, a display screen, and a television.

The above-mentioned are merely preferred embodiments of the present disclosure, and it should be understood that the present disclosure is not restricted to the forms disclosed herein, and should not be regarded as excluding other embodiments, but may be used in various other combinations, modifications, and environments, and can be altered through the above teachings or technologies or knowledge in related art within a scope of concept described herein. All of the alterations and changes made by a person in the art, without departing from the spirit and scope of the present disclosure, should be within the scope of protection of the claims attached to the present disclosure.

What is claimed is:

1. A drive circuit, comprising:
a first module, generating display data based on image information;
a second module, generating a display signal based on the display data and a plurality of clock signals;
a third module, outputting a constant current based on the display signal; and
a fourth module, configured to provide a reference current to the third module, wherein
the fourth module comprises: a reference voltage generation module, a bias module, a current generation module, and a pre-charging module, wherein the reference voltage generation module is configured to provide a reference voltage to the bias module, the bias module is configured to provide a bias current to the current generation module and provide a bias voltage to the pre-charging module, and the current generation module is configured to provide a reference current to the third module; and
any two adjacent clock signals of the plurality of clock signals differ by M complete clock cycles, $0 \leq M < 1$.

2. The drive circuit according to claim 1, further comprising a fifth module, configured to generate N clock signals, where $M=1/N$, and N is an integer greater than or equal to 2.

3. The drive circuit according to claim 2, wherein the second module comprises:
a first sub-module, generating a first display signal based on a first clock signal and the display data; and
a second sub-module, generating the display signal based on a selected clock signal and the first display signal, wherein
the first clock signal is any one of the N clock signals; and the selected clock signal is delayed by i/N complete clock cycles from the first clock signal, where i is an integer between 0 and (N−1).

4. The drive circuit according to claim 3, wherein the second module outputs one of the N clock signals as the selected clock signal according to a selection signal, wherein the selection signal is generated based on the display data.

5. The drive circuit according to claim 2, wherein the second module comprises:
a third sub-module, generating a first display signal based on a first clock signal and a reset signal;
a plurality of fourth sub-modules, wherein each of the fourth sub-modules generates a second display signal based on one clock signal of second clock signals and the reset signal; and one clock signal of the second clock signals received by each fourth sub-module is different from the other; and
a fifth sub-module, receiving display signals generated by the third sub-module and the plurality of fourth sub-modules, and outputting one of the display signals according to a selection signal, wherein
the first clock signal is any one of the N clock signals; the second clock signals are clock signals among the N clock signals other than the first clock signal; and the reset signal and the selection signal are generated according to the display data.

6. The drive circuit according to claim 5, wherein the second module further comprises a sixth sub-module; and the sixth sub-module inverts a signal output by the fifth sub-module and performs a logical operation on an inverted signal and the first display signal.

7. The drive circuit according to claim 1, wherein the first module is further configured to add one clock cycle to the display data and then output the display data.

8. The drive circuit according to claim 3, wherein the drive circuit further comprises: a path matching module, configured to eliminate an unknown phase difference between the selected clock signal and the first clock signal.

9. The drive circuit according to claim 6, wherein the drive circuit further comprises:
a compensation module, configured to eliminate an unknown delay between the first display signal and a display signal selected by the selection signal.

10. The drive circuit according to claim 1, wherein the drive circuit further comprises a current trimming module; and the current trimming module is connected to the current generation module and provides a trimming current to the current generation module.

11. The drive circuit according to claim 10, wherein the drive circuit further comprises a voltage trimming module, the voltage trimming voltage is connected to the pre-charging module, and provides a trimming voltage to the pre-charging module.

12. A drive chip, comprising the drive circuit according to claim 1.

13. A display device, comprising display equipment and the drive chip according to claim 12, the drive chip generating a drive signal so as to drive the display equipment to display.

14. The drive circuit according to claim 2, wherein the first module is further configured to add one clock cycle to the display data and then output the display data.

15. The drive circuit according to claim 3, wherein the first module is further configured to add one clock cycle to the display data and then output the display data.

16. The drive circuit according to claim 4, wherein the first module is further configured to add one clock cycle to the display data and then output the display data.

17. The drive circuit according to claim 4, wherein the drive circuit further comprises: a path matching module, configured to eliminate an unknown phase difference between the selected clock signal and the first clock signal.

18. The drive circuit according to claim 2, wherein the drive circuit further comprises a current trimming module; and the current trimming module is connected to the current generation module and provides a trimming current to the current generation module.

19. The drive circuit according to claim 5, wherein the first module is further configured to add one clock cycle to the display data and then output the display data.

20. The drive circuit according to claim 6, wherein the first module is further configured to add one clock cycle to the display data and then output the display data.

* * * * *